United States Patent [19]

Heermans

[11] Patent Number: 4,776,296
[45] Date of Patent: Oct. 11, 1988

[54] MOUNTING FOR AUDIBLE SIGNAL VALVE KNOB

[75] Inventor: Thomas W. Heermans, West Bend, Wis.

[73] Assignee: Regal Ware, Inc., Kewaskum, Wis.

[21] Appl. No.: 12,584

[22] Filed: Feb. 9, 1987

[51] Int. Cl.[4] .................... G01L 19/12; A47J 27/212
[52] U.S. Cl. ..................................... 116/70; 99/344; 126/388
[58] Field of Search ............... 99/342, 344; 116/67 R, 116/70; 126/388; 411/418, 419; 220/367

[56] References Cited

U.S. PATENT DOCUMENTS

| | | | |
|---|---|---|---|
| 1,135,699 | 4/1915 | Knauber | 174/63 |
| 2,549,393 | 4/1951 | Siesel | 411/419 |
| 4,134,358 | 1/1979 | Heermans | 116/70 |
| 4,155,349 | 5/1979 | Hudson | 116/70 |
| 4,418,637 | 12/1983 | Heermans | 116/70 |

Primary Examiner—William A. Cuchlinski, Jr.
Assistant Examiner—W. Morris Worth
Attorney, Agent, or Firm—Wheeler Law Firm

[57] ABSTRACT

A knob for a cooking vessel is a whistle which gives an audible signal that cooking temperature has been reached, and has a valve slide assembly including a separate leaf spring for shutting off the whistle. Inside and outside knob parts incorporate halves of a resonance chamber which makes the knob extremely simple to mold, assemble, clean, and disassemble. The inner knob is comprised of two parts: a top having a whistle orifice and a base which has two arc segments portions which extend through the lid of a cooking vessel and allow the top to be snapped into place abutting the cooking vessel lid. Because the inner knob is comprised of two parts in this fashion, the central opening in the cooking vessel top can be made small enough so that it will be difficult for a user to catch his or her fingers in the opening when the knob is dissasembled for cleaning. The valve slide rests in guides and is overlaid by a knob cover. The leaf spring biases the valve slide against the top wall of the resonance chamber so that when the slide valve is closed the passage from the resonance chamber to the ambient air is effectively blocked.

5 Claims, 1 Drawing Sheet

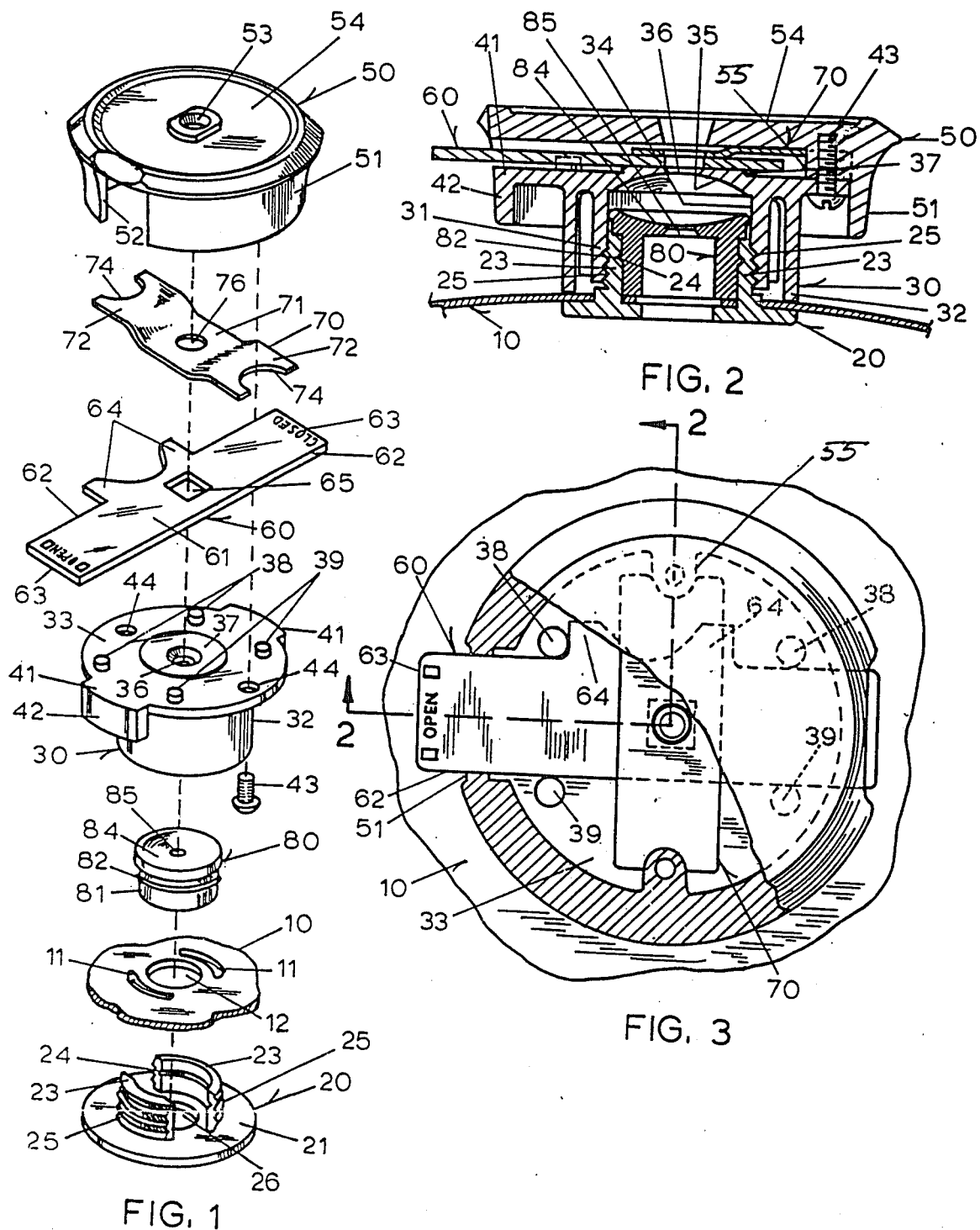

MOUNTING FOR AUDIBLE SIGNAL VALVE KNOB

BACKGROUND OF THE INVENTION

"Waterless" cooking is old, as are knobs which give an audible signal when steam is formed to indicate attainment of cooking temperatures. Tops for cooking vessels which are provided with whistles and having means to turn the whistle off or to allow the escape of steam are also known. However, mechanically these are quite different from my device. Many such knobs cannot be disassembled. Those few which can be disassembled for cleaning could also release the knob portion accidently under steam pressure, which might well cause loss of the knob or even injury. The present invention has the advantage over my previous invention U.S. Pat. No. 4,418,637 (Heermans) in that the current valve assembly allows the opening in the lid of the cooking vessel to be substantially reduced preventing accidental insertion and injury of the user's finger or fingers during assembly or disassembly.

SUMMARY OF THE INVENTION

A knob for the top or lid of a cooking vessel is provided with a whistle, a resonance chamber, and a slide valve assembly, including a separate leaf spring. The knob has six major parts: an inner knob base which preferably has two arc segment parts, but may have more than two arc segment parts, which project through complementary openings in the lid; and an inner knob top which engages the base portion and which carries a whistle orifice and a portion of a resonance chamber; an upper body portion which screws onto the base portion outside the vessel lid which carries lid engaging parts, asymmetric slide valve guides and stops, and the upper portion of the resonance chamber; the slide valve member itself, which is so shaped as to incorporate asymmetric abutments for the guides and stops on the upper body; a valve knob cover portion preferably non-rotatively fastened to the upper body to enclose the valve slide and to provide a surface for a decorative design or wording and to provide a means to separate the knob at the resonance chamber; and a leaf spring which bears between the slide valve member and the valve cover portion to assist in seating the valve and to keep the valve member in place. Each of the parts contains an opening through which steam and sound may escape, the opening in the valve slide being movable from a position aligned with the other openings to a position displaced from the other openings. Because of the preferred screw assembly of the knob bases to the remainder of the knob and the snap fit of the inner knob top to the inner knob base, the parts may be readily detached by the user from the vessel top for cleaning and the portions needing to be cleaned are readily accessible. In particular the resonance chamber separates into three easily cleaned parts. If necessary, the removal of two screws allows complete disassembly of the knob for more thorough cleaning. The valve spring is then also easily removed and easily cleaned. The correct assembly is readily determined by inspecting the parts because the shapes of the parts dictate correct assembly. At the same time the slide is so made that when it is assembled it is capable of only limited movement so that it cannot be lost. The knob is sufficiently large so that it may be readily grasped without contact with steam emerging from the central opening. When the contents of a vessel have reached cooking temperature, as indicated by whistling, the slide valve is closed and the temperature reduced for waterless cooking at reduced temperatures and pressures. Not all of these features need to be present in my invention, but preferably they are. The slide valve keeps the user's fingers away from the steam, with the help of the cover.

DRAWINGS

In the drawings, FIG. 1 is an exploded perspective view of the parts of my audible signal valve knob.

FIG. 2 is a cross-sectional view of my knob and of a vessel top in which it is installed taken along line 2—2 in FIG. 3.

FIG. 3 is a top view of my knob with parts broken away.

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

As best shown in FIG. 1, the top of a cooking vessel 10 is provided with two arc segment openings 11 and a circular opening 12 to which the various parts of theknob of my invention are mounted. These consist of an inner knob base 20, an inner knob top 80, an outer knob 30, a knob cover 50, a valve slide 60, and a leaf spring 70.

The inner knob base 20 consists of a lower flange 21, two arc segment portions 23 to complementarily fit the arc segment openings 11 in the vessel 10, and a small circular opening 26. The two arc segment portions 23 have threads 25 on their outside surfaces and each has a groove 24 on its inside surface. The inner knob top 80 consists of an outer skirt 81 which has a thin ridge 82 around its circumference and a lower resonance chamber portion 84 surrounding a whistle orifice 85 having a form suited to generate a tone when vapor passes through it. Orifice 85 is better shown in FIG. 2. The inner knob top 80 is fixed in place by inserting the inner knob 80 between the arc segment portions 23 of the inner knob base 20 which projects through the vessel lid 10. The exterior ridge 82 on the inner knob top 80 and the interior groove 24 on the arc segment portions 23 engage each other snapping the inner knob top 80 in place as shown in FIG. 2. Preferably, when the inner knob top 80 is snapped in place, its skirt 81 abuts the cooking vessel 10.

Outer knob 30 consists of an inner skirt 31 adapted to screw on to the threads 25 of the arc segment portions 23 of the inner knob base 20, an outer skirt 32 which bears on the vessel 10 when outer knob 30 is screwed into place, a horizontal valve supporting surface 33, resonance chamber sidewall 34 and resonance chamber upper wall 35, a second whistle orifice 36 in the center of the resonance chamber upper wall 35 and directly above the first orifice 85 in the assembled position, and slide guide abutments 38 and 39. At diametrically opposite positions on valve supporting surface 33 the outer knob 30 is provided with slight projections 41, each provided with a depending tab 42 which underlies the slide valve path and becomes part of the knob cover 50, which aligns it for non-rotatable assembly by means of screws 43. The knob cover 50 is provided with a depending skirt 51 extending entirely around the knob and enclosing the sides of the depending tabs 42 of the upper knob 30 with the cut-out portions 52, so that when the knob cover 50 is placed unto the upper knob body it is automatically aligned to receive screws 43 which secure the upper knob body to the knob cover 50 through holes 44. Knob cover 50 has an orifice 53 in the center of the upper wall 54 and aligned with orifices 85 and 36. Knob cover 50 also has bosses 55 depending from the underside of its upper wall 54 within the margin of skirt 51 to receive screws 43 and to assist in locating valve spring 70. Bosses 55 are shown in FIG. 3. The relieved portions 52 in skirt 51 in addition to forming keys to receive paths 42 for non-rotatable alignment also serve in their upper portion as part of the valve slide path. Ends of the valve slide means 60 project there from so that they may be manipulated, as will be described later. Valve slide 60 rests on boss 37 and is moveable along a valve slide means path extending from one surface extension 41 to the opposite projection 41 between slide guide abutments 38 and 39, along a chord of the knob, preferably a diameter.

Valve slide means 60 consists of a valve member having a pair of long sides 62 and a pair of ends 63. One of the long sides 62 is provided with a pair of sidewardly extending abutments 64 which are spaced apart a distance along the slide valve path which is sufficiently less than the distance between the slide stop abutments 38 and 39 in the same direction for whistle orifice 65 to be moved in the direction of the valve slide path to a first position over orifice 36 and to a second position completely unaligned with orifice 36. For that purpose it is preferable that orifice 65 not be in the exact center of rectangular body 61 but be spaced slightly from the center in the direction parallel to long side 62 into the valve slide path.

Leaf spring 70 is a generally rectangular member made of any suitably resilient and heat resistant material such as spring stainless steel. It has a depressed central portion 71, a raised wing 72 at each end, a forked end 74 in each wing to locate spring 70 between the bosses 55 depending from knob cover 50, and a central orifice 76 positioned coaxially of orifices 85, 36 and 53 when the knob is assembled. The leaf spring biases valve slide means 60 away from upper wall 54 and to engagement with boss 37, so that the valve slide is always biased into good contact with the boss 37 and provides an effective seal when the valve is closed. The exact amount of bias can be varied by changing the dimension of or material of leaf spring 70; the bias should be sufficient to create a seal and maintain the selected position of slide 60, but not so great as to distort the valve slide or prevent the slide from being operated to open or close the valve. Thus, in the present embodiment valve means are defined by valve supporting surface 33, whistle orifice 36, boss 37, valve slide means 60 and the parts 62 through 65 thereof, and leaf spring 70 varying between upper wall 54 and valve slide means 60. These parts cooperate together to regulate the flow of a gas such as air between whistle orifice 36 and the exterior of the knob according to the position of the valve slide means 60 and the previously defined valve slide path. When my knob is assembled as shown in FIGS. 2 and 3, one of the ends 63 of valve slide means 60 will project through one of the relief portions and knob portion 50 will preferably bear a legend indicating whether the valve was opened or closed. It may be slid along the valve path by finger pressure on the exposed end 63 to push that end flush with knob skirt 51 and expose the other end 63, thereby opening or closing the valve. The valve construction described is simply made, readily cleaned and reassembled, and keeps the fingers of the user away from escaping steam, unlike earlier structures.

As a whistle, the knob presents a series of orifices 85, 36, 65, 76, and 53 separated by a resonance chamber consisting of a lower resonance chamber portion 84 in inner knob top 80, and resonance chamber sidewall 34 and resonance chamber wall 35 in the outer knob 30, which form a very effective whistle. The remaining three orifices are not a part of the whistle, as such but provide a valve and an escape path respectively. When food is being heated in a vessel, a temperature is reached at which water vapor is generated and passes through orifices 85 and 36 and the intervening resonance chamber, creating a whistling sound to warn the cook that the temperature should now be reduced for effective waterless cooking. The valve slide 60 is then moved from the open position shown in FIG. 2 to its closed position in which orifice 65 is displaced with respect to orifice 36, by pushing on the projecting end 63 of the valve slide which is at the left in FIG. 3 until the other abutment 64 strikes the corresponding slide stop abutment 38. The top or lid of a cooking vessel 10 in which the knob is located is now completely sealed and will retain the vapor within the pan to seal in the flavors and moisture. Such cooking is well-known.

However the presence of the whistle orifices in the resonance chamber of my knob offer the possibility of contamination by volatile food substances, or even by solids passing through orifice 85. In any case it is important to be able to attain complete cleanliness in the knob. As best shown in FIG. 1, by removing the entire outer knob 30, spring 70, slide 60, and knob cover 50 by unscrewing them from inner knob base 20, and by unsnapping inner knob top 80 from inner knob base 20, the entire knob may be removed from vessel 10. It will be noted that although pressure can be applied only to knob cover 50, the reliefs 52 serves to prevent relative rotation, as do screws 43, and apply the pressure to tabs 42 of the upper knob body, carrying it along as the cover 50 is rotated. Because the openings 11 do not allow the knob base 20 to be rotated once the arc segment portions 23 are inserted through the openings 11, it is easy to turn the upper portion while the lower portion remains stationary. Inner knob top 80 may then be unsnapped, releasing the knob base also. The only remaining step to completely disassemble the knob, if that is necessary, is to remove the two screws 43. These have been exposed once the outer parts of the knob are removed, but are concealed in insulative plastic when the knob is assembled.

When the slide 60 and the spring 70 are in place on outer knob 30 cover 50 is placed over them being guided by tabs 42 and reliefs 52 into a position so that screws 43 are perfectly in line for insertion. With screws 43 in place the entire outer part of the knob is unitary. The arc segment portions 23 of knob base 20 may then be inserted in vessel top 10 through openings 11, the inner knob 80 may then be snapped into place between the arc segment portions 23, and the outer knob part may be screwed unto threads 25, whereupon skirt 32 bears on vessel 10 above flange 21 to give a very secure anchorage.

It will be seen from FIG. 1 that while the parts are disassembled all surfaces are readily accessible for cleaning, whether the disassembly is complete or whether the upper separable parts are merely unscrewed from the base part.

I claim:

1. In a knob for a cooking vessel having a top: an inner knob provided with a first whistle orifice and a surrounding lower resonance chamber portion; an outer knob having a surface abutting the vessel top, said outer knob being removably secured to said inner knob and disposed outside the vessel top, said outer knob comprising an upper resonance chamber wall having a second orifice therein, said lower resonance chamber portion and upper resonance chamber wall together enclosing a resonance chamber, the improvement comprising:

a two piece inner knob comprised of an inner knob base and an inner knob top;

said inner knob base having an opening in its center and arc segment portions projecting through the vessel top, said arc segment portions having means on their exterior surfaces capable of engaging said outer knob, said arc segment portions having means on their interior surfaces capable of engaging said inner knob top;

said inner knob top being provided with a first whistle orifice and a surrounding lower resonance chamber portion, said inner knob top having a skirt portion extending longitudinally from said resonance chamber portion, said skirt portion having a means on its exterior surface capable of engaging with the interior surface of said arc segment portions of said inner knob base.

2. The device of claim 1 in which the means on the exterior surfaces of said arc segment portions are screw threads and said outer knob is removably secured to said inner knob by screwing said outer knob onto said inner knob.

3. The device of claim 1 in which the means on the interior surfaces of said arc segment portions capable of engaging said inner knob top is a groove and the means on the interior of the skirt of said inner knob top capable of engaging said arc segment portions is a ridge around the circumference of said skirt.

4. The device of claim 1 in which the skirt of said inner knob top abuts the cooking vessel when said inner knob top engages said inner knob base.

5. The device of claim 1 in which there are only two arc segment portions.

* * * * *